United States Patent [19]

Capelle

[11] Patent Number: 4,927,482
[45] Date of Patent: May 22, 1990

[54] METHOD AND APPARATUS FOR PRODUCING TREAD STRIPS FOR AUTOMOTIVE VEHICLE TIRES

[75] Inventor: Gerd Capelle, Langenhagen, Fed. Rep. of Germany

[73] Assignee: Hermann Berstorff Maschinenbau GmbH, Hanover, Fed. Rep. of Germany

[21] Appl. No.: 267,346

[22] Filed: Nov. 4, 1988

[30] Foreign Application Priority Data

Nov. 6, 1987 [DE] Fed. Rep. of Germany ....... 3737676

[51] Int. Cl.$^5$ .............................................. B29C 47/06
[52] U.S. Cl. ................................ 156/243; 156/244.11; 156/244.18; 156/244.27; 156/500; 156/501
[58] Field of Search ............. 156/243, 244.11, 244.22, 156/244.18, 244.27, 500, 501; 264/171, 172, 176 R; 425/131.1, 133.5, 192 R, 194, 190, 224, 374

[56] References Cited

U.S. PATENT DOCUMENTS

| | | | |
|---|---|---|---|
| 68,365 | 9/1867 | Hull | 156/501 |
| 1,603,813 | 10/1926 | Stein | 156/501 |
| 1,783,263 | 12/1930 | Schnuck | 156/501 |
| 1,793,612 | 2/1931 | Harvey | 156/501 |
| 2,437,873 | 3/1948 | Beward | 156/501 |
| 2,771,246 | 11/1956 | Schneider et al. | 236/1 |
| 2,987,948 | 6/1961 | Casullo | 83/425 |
| 4,539,169 | 9/1985 | Nixon et al. | 264/171 |

Primary Examiner—Caleb Weston
Attorney, Agent, or Firm—Foley & Lardner, Schwartz, Jeffery, Schwaab, Mack, Blumenthal & Evans

[57] ABSTRACT

A method and an apparatus for producing laminated profile strips from a plurality of rubber components destined to be used in automotive vehicle tires are disclosed. The individual rubber profile strips, formed from various mixtures are each extruded from individual extrusion devices. Each extrusion device has its own extrusion head having an appropriate nozzle outlet which delivers each strip onto its own individual roller. The edges of each strip are trimmed while it is on its roller. The rollers are disposed adjacent one another so as to define roller nips therebetween. The component strips are subsequently laminated together in the nips to form either an intermediate or final profile strip. If an intermediate strip is produced, this remains on one of the rollers and is jointly passed through a further nip between the roller on which is located and a further roller carrying either a further individual strip or a further intermediate profile strip produced in a like manner to produce the final strip.

9 Claims, 2 Drawing Sheets

METHOD AND APPARATUS FOR PRODUCING TREAD STRIPS FOR AUTOMOTIVE VEHICLE TIRES

FIELD OF THE INVENTION

The present invention relates to a method of producing tread strips for automotive vehicle tires from a plurality of rubber or synthetic rubber components and to an apparatus in which such a method can be performed. More particularly, the present invention relates to a method in which each component is extruded from a separate extrusion device onto a roller assembly and to an apparatus including such an assembly.

BACKGROUND OF THE INVENTION AND PRIOR ART DISCUSSION

In U.S. Pat. No. 4,539,169 there is described an extrusion apparatus for forming a co-extrusion from extruded strips. In such arrangement there is provided a plurality of individual extrusion devices, each terminating in an extrusion head and extruding a profile strip onto a single common rotating roller. The upper surface of the nozzle outlet of each extrusion head is in the form of an extrusion bar which has a shape which corresponds with that of the upper portion of the tread strip to be produced. The lower surface of the nozzle outlet is formed by the rotating roller.

The rotation of the roller promotes the removal of each of the component profile strips from which the tread strip is produced, from the extrusion head, whereby the extrusion pressure in the head can be reduced. There are considerable advantages to be gained if the extrusion head can be operated at lower extrusion pressures. For example, the means for sealing the heads can be simplified. More especially, in conventional arrangement, high extrusion pressures of up to 200 bars exist in the extrusion heads and, accordingly, there is a risk of undesirably introducing shearing energy into the rubber mixtures, which are somewhat temperature-sensitive. This risk is substantially reduced in the arrangement described in U.S. Patent Specification No. 4,539,169. Furthermore, the roller exerts an additional calibrating effect upon the tread strip portion, whereby the accuracy of the finished tire profile is increased.

However, such a single roller system has disadvantages, particularly if a tread strip, formed from a plurality of rubber mixtures having substantially different properties, such as viscosities, from one another, is to be produced.

Since the lower surface of the nozzle outlet is formed by the rotating roller, this means that there is a small, but significant spacing between the nozzle roller. Accordingly, the extruded profile must always be extruded onto the roller in a width wider than is actually needed. This is because, otherwise, the full thickness in the edge regions of the relatively thin profile strip would not be extruded. The excess width is removed by an edge trimming operation, which is known in technical circles as "flashing" in consequence, the edges of the profile strips need subsequently to be trimmed.

In practice, it is usually very difficult to provide edge trimming cutters and to discharge the trimmed edges efficiently using a single roller system, due to a shortage of space. Only the edges of the finished profile can be trimmed, that is to say, the edges of the tread strip which is extruded from the plurality of different rubber mixtures.

Such edge trimmings cannot be re-utilised because they comprise mixtures of rubber having substantially different properties. Thus, for example, the rubber used for giving good wear resistance to the tread strip has a very high carbon content while the rubber used for the inner ply of the tread strip is very soft.

In consequence, several tons of scrap edge strips are produced every day. Such scrap cannot be re-used or, at best, can only be used for the manufacture of very inexpensive, low quality rubber articles.

The edges of the rubber mixtures, which overlap one another in the centre of the tyre profile, cannot be trimmed because it is only possible to trim the edges of the finished tread strip. In consequence, considerable inaccuracies have to be tolerated in respect of the finished tire profiles produced on such a single roller head system. This, inevitably, causes weak spots to be produced in the finished automotive vehicle tire. It is also not possible to trim the edges of the individual tread strip components when such a head is employed.

OBJECTS OF THE INVENTION

The present invention seeks to provide a method and an apparatus for producing tire profiles of very high quality comprised of a plurality of rubber components.

The present invention also seeks to provide a method which is simple to carry out and which is reliable, and an apparatus which necessitates only simple extrusion heads. Furthermore, the present invention seeks to provide a method and apparatus which makes it possible to trim the edges of all of the component strips individually.

SUMMARY OF THE INVENTION

According to the present invention there is provided a method of producing profile strips for tread strips, lateral strips, inner liners and the like of automotive vehicle tires from a plurality of different rubber components, comprising the steps of extruding each said component individually in a separate extrusion device, passing each said extruded component through a separate extrusion head to produce a strip of said extruded component, discharging each said strip through nozzle means at the outlet of said head, each said nozzle means comprising a stationary lip and a movable lip which comprises a rotatable roller to cause said strip to pass around said rotatable roller, edge-trimming both lateral edges of each said strip while said strip is disposed on said roller, disposing said rollers in a roller assembly whereby said roller associated with each said extrusion device lies closely adjacent said roller associated with at least one of said other extrusion devices to define a roller nip therebetween, and laminating together said individual edge-trimmed strips by passing said strips through said at least one roller nip.

Also according to the present invention, there is provided an apparatus for producing profile strips for tread strips, lateral strips, inner liners and the like of automotive vehicle tires from a plurality of different rubber components comprising a separate extrusion device for each component, each said extruder including head means for forming each said extruded component into a strip, said head means including strip outlet nozzle means, said outlet nozzle means comprising a first stationary lip and a second movable lip, and rotatable roller means including an outer peripheral surface, said outer peripheral surface forming said second lip of said nozzle means and causing each said strip extruded from each said nozzle means to pass around said associated roller means, edge-trimming means disposed adjacent each said roller for trimming both lateral edges of each said strip while said strip is located on said roller, said rollers from said separate extrusion devices jointly forming a roller assembly whereby the said roller associated with each said extrusion device lies closely adjacent the said roller associated with at least one other said extrusion device to define a roll nip therebetween, whereby the strips disposed on each said roller defining said roller nip pass jointly through said nip and are laminated together thereby.

By producing each component of the finished profile individually in strip form utilising a single roller head for each component, the manufacturing process is considerably enhanced. The control of the temperature in each individual head can be adapted to the optimum extrusion viscosity of the specific rubber mixture being extruded therethrough.

In U.S. Pat. No. 4539169, there is provided a single common roller head which is fed from three or more flow channels disposed one above the other. In such an arrangement only a general head temperature and not specific temperatures for each component, can be set.

However, the most serious disadvantage of the above-mentioned known arrangement resides in the fact that there is only one single common roller, onto which all of the profile component strips are extruded in succession. Accordingly, such roller can only be set at one temperature. As a result, the optimum lamination temperature, which is usually not the same for all of the profile component strips, cannot be used. In consequence, the lamination of the individual strips upon one another is not entirely satisfactory. Thus, weak spots in the final product, that is to say, the tread strip of an automotive vehicle tire, cannot be avoided.

By extruding the individual component strips in separate heads and on separate rollers, as is the case in the present invention, the most favourable processing temperature can be utilised in an individual manner, so as to conform with the optimum processing viscosity of the component concerned.

It is important that the edges of each profile component strip can be trimmed exactly to their required final dimensions. This is of particular importance in the case where a relatively narrow strip is to be laminated onto relatively wide profile component strips.

As mentioned hereinbefore, strips which are laminated in such manner and have, to some extent, very thin lateral lips, must initially be extruded in a wider form than is necessary in the finished product in order to provide the thin lips with the full dimensions. In a head configuration as shown in U.S. Pat. No. 4,539,169, either the exact desired configuration of the thin lateral lips cannot be achieved or the narrower upper strips which are extruded onto lower wider strips must have a protruding "flash".

In addition to the fact that the protruding flash wastes material, it is also disadvantageous in that it has no pre-set dimensions. Accordingly inaccuracies in the finished profile cannot be avoided.

By extruding precisely temperature-controlled individual strips from individual extrusion heads onto specifically temperature-controlled individual rollers, as is the case in the present invention, it is possible to set the optimum lamination conditions in the roller nips.

The individual roller head system of the invention also has considerable advantages.

By producing the individual component strips in separate extrusion heads each provided with an individual roller, the configuration of the head, the flow channels contained therein, the insert member and the particular nozzle extrusion bar at the outlet of the head are kept simple. More particularly, the replacement of the extrusion bars and the inserts when it is desired to produce a tread strip having a different size of composition is also substantially simplified.

In the construction described in U.S. Pat. No. 4,539,169, the individual profile component strips are each extruded one above the other into a common rotating roller. In such circumstances, the individual strips can easily become deformed when one strip is extruded onto the strip already present on the roller.

In the present invention, however, the individual strips are laminated together in a roller nip in a substantially pressureless manner. The individual rollers are caused to rotate at an identical circumferential speed and at the optimum lamination temperatures. By so doing, excellent lamination of the strips together is ensured.

BRIEF DESCRIPTION OF THE DRAWINGS

The invention will be further described, by way of example, with reference to the accompanying drawings, in which.

DESCRIPTION OF PREFERRED EMBODIMENTS

Figure 1:
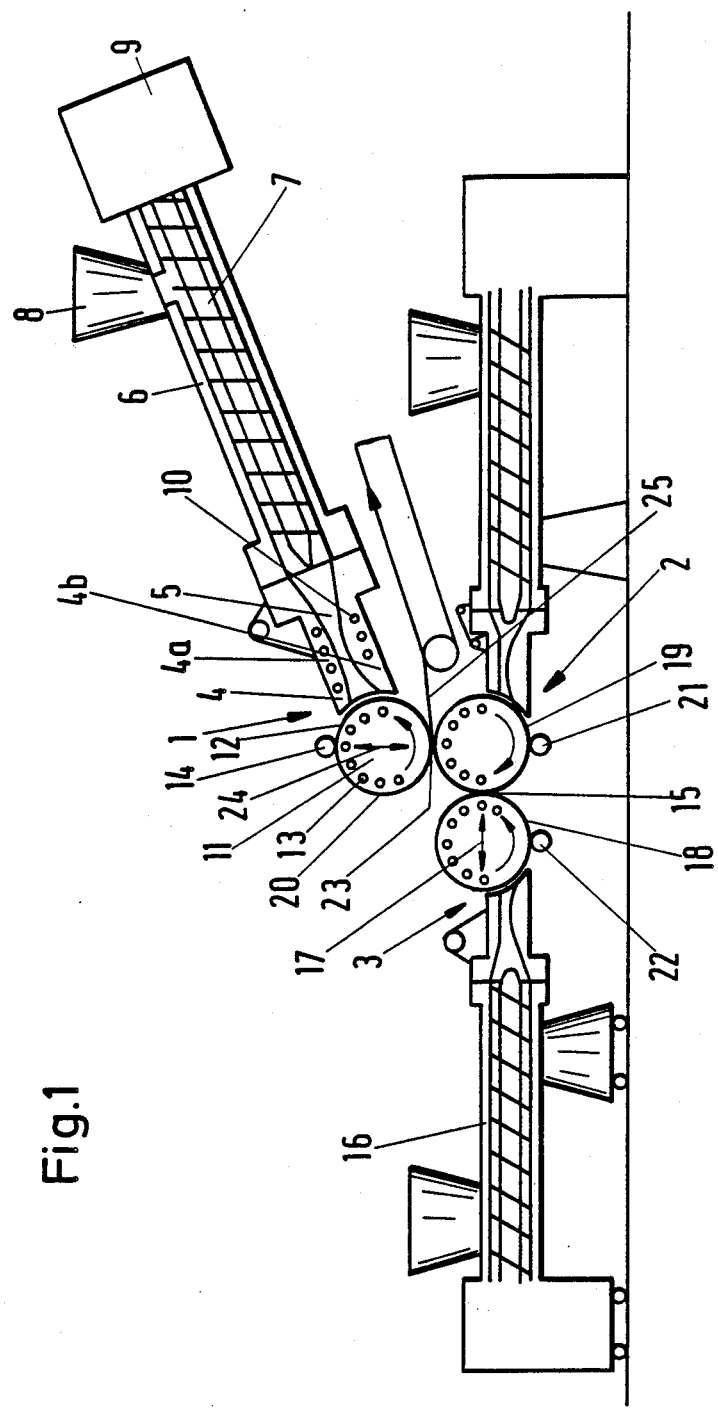
FIG. 1 shows, schematically, an apparatus for producing tread strips for automotive vehicles in accordance with the present invention, the apparatus comprising three extrusion devices each having a single roller head associated therewith.

In FIG. 1, there is shown an extrusion device having a single roller head associated therewith, the assembly of the extrusion device and the roller head being generally referenced 1. Such assembly 1 comprises an extrusion head 4 having flow channels 5 formed therein. An extrusion device 6 is flange-mounted on the head 4. The device 6 includes an extrusion screw 7, a feed hopper 8 and a drive and transmission assembly 9. The head 4 comprises an upper portion 4a and a lower portion 4b in which bores 10, for permitting the temperature of the head 4 to be controlled, are provided in a known manner. The bores 10 have temperature-control means connected thereto which are also known and are therefore not shown. This permits an exact head temperature to be set and maintained.

The shape of the front surface of the head 4 is adapted to the curvature of the curved surface of a roller 11 which is disposed immediately downstream thereof. The roller 11 has a rotatable outer shell 12 and the outlet aperture from the head 4 is defined by the pivotably disposed upper portion 4a of the head and by the rotating shell 12. The rotating roller shell, which forms the lower boundary for the outlet aperture, assists in the extraction of the material from the head and, in consequence, a substantially lower material pressure than would otherwise be the case can prevail in the head.

Axially extending hours 13 for permitting the temperature of the roller 11 to be controlled are provided in the roller 11 and, together with an internal bore (not shown), form a circulatory system which is similar to the circulatory system described in U.S. Pat. No. 2,771,246. This system permits a very accurate control of the temperature over the entire width of the roller.

A known edge trimming means is disposed on the roller 12 and is provided with circular cutters 14, each of which cutters is disposed, for example, on a respective rotary spindle. One such cutter is provided on each side of the extruded profile strip and is adapted to be adjustable both in the direction of the longitudinal axis of the roller and in a radial direction relative thereto. Instead of providing circular cutters which are entrained by the roller shell, stationary, tapered cutters may be provided, as is also shown in U.S. Pat. No. 2,987,948.

Two further assemblies 2 and 3 of an extrusion device and a single roller head are provided, the construction of the assemblies 2 and 3 being identical to that described hereinbefore in respect of assembly 1. Each assembly 1,2,3 produces a profile strip component which components are then joined together to form a tread strip for an automotive vehicle.

In the present embodiment, the strip components 18 and 19 produced by means of the assemblies 2 and 3 respectively, are laminated together in a substantially pressureless manner in the roller nip 15 between the adjacently-disposed rollers of the assemblies 2 and 3. The assembly 3, including the extrusion device 16 forming part thereof is displaceable, as indicated by the arrow 17, in order to permit the size of the nip 15 to be set exactly.

The strips 18 and 19 are provided with their desired dimensions by edge trimming means 21 and 22 respectively. The trimmed edge strips are collected by known means (not shown) and re-supplied, immediately, to the particular extrusion devices in which they were produced, so that no waste occurs. Since the trimmed strips each only comprise one mixture component, there is no problems whatsoever in returning them to the particular feed hoppers of their associated extrusion devices, and this phenomenon constitutes a considerable advantage over the manufacturing process described in U.S. Pat. No. 4,539,169. In this latter arrangement, the edge strips, when trimmed, are formed from a plurality of components and cannot be re-introduced into any particular one of the extrusion devices, because the particular mixture in such extrusion device would become contaminated.

The trimmed strips 18 and 19, which have been laminated together in the nip 15, pass into the nip 23 formed between the roller of the assembly 2 and the adjacently disposed roller 11 of the assembly 1. In such nip, the combined strips 18 and 19 are laminated with the strip 20 formed by the assembly 1 to form a three-component strip. The size of the nip 23 is made adjustable by mounting the assembly 1, including the extrusion device 6 and the drive and transmission unit 9, in a displaceable manner, as is indicated by the arrow 24.

The tread strip 25 which is thus produced from the three component strips is subsequently supplied to a further processing station such as a station for cutting the strip 25 to required lengths.

Figure 2:
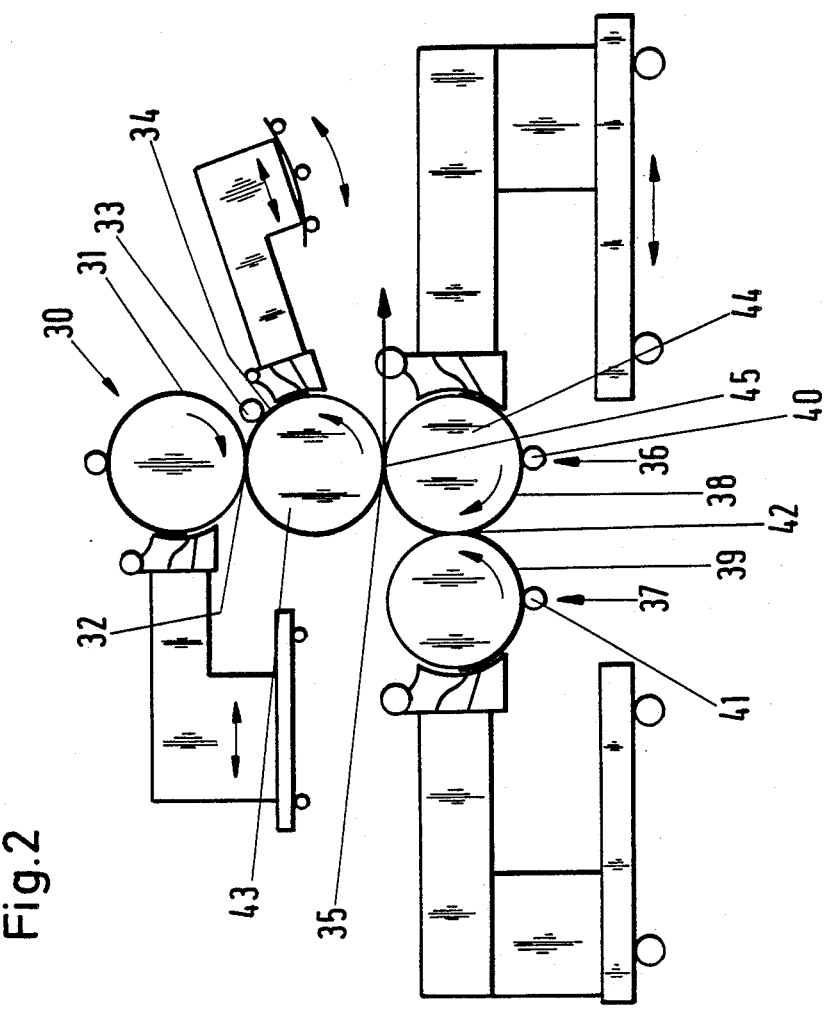
FIG. 2 shows, schematically, an apparatus similar that shown in FIG. 1 but in which four extrusion devices each having a single roller head associated therewith are provided.

The apparatus shown in FIG. 2, is almost identical to that shown in FIG. 1 except that four assemblies 30,36,37 and 43 are provided. Each assembly is identical to the assembly 1 described with reference to FIG. 1. In the FIG. 2 embodiment, the assembly 30 produces a strip 31 which is edge-trimmed and is then laminated with the strip 34, previously edge-trimmed by the trimming arrangement 33, in the nip 32 between the rollers of the assemblies 30 and 43.

After their edges have been trimmed by cutters 40 and 41, the strips 38 and 39, which are produced by the assemblies 36 and 37, pass into the nip 42 where they are laminated together. This combined laminated strip is then conveyed by the roller 44 into the nip 45, as is the combined laminated strip 31, 34. All four profile component strips are laminated together in the nip 45, which is formed between the rollers 43 and 44, and the thus-formed tread strip is removed.

I claim:

1. A method of producing profile strips for tread strips, lateral strips, and inner liners, of automotive vehicle tires from a plurality of different rubber components, comprising the steps of:
   (a) extruding each of at least two components individually in at least two separate extrusion devices;
   (b) passing each said extruded component through a separate extrusion head each associated with one of said at least two extrusion devices to produce a strip of said extruded component;
   (c) discharging each said strip through separate nozzle means at the outlet of each of said extrusion heads, each said nozzle means comprising a stationary lip and a movable lip comprising a single rotatable roller around which strip passes;
   (d) edge-trimming both lateral edges of each of said strips while said strip is disposed on said associated roller;
   (e) disposing said rollers in a roller assembly such that said roller associated with each of said at least two extrusion devices lies closely adjacent the roller associated with another of said at least two extrusion devices to define at least one roller nip therebetween; and
   (f) laminating together said individual edge-trimmed strips by passing said strips through said at least one roller nip.

2. The method as recited in claim 1, wherein first, second and third said extrusion devices are provided, each extrusion device having a single roller associated therewith, edge-trimming both lateral edges of each of said strips while said strip is disposed on its associated roller, wherein said rollers associated with said first and second extrusion devices each lie closely adjacent said roller associated with said third extrusion device whereby said rollers associated with said first and third extrusion devices define a first nip and said rollers associated with said second and third extrusion devices define a second nip, and wherein said edge-trimmed strips disposed on said rollers associated with said first and third extrusion devices are passed jointly through said first nip to produce an intermediate laminated profile strip, said intermediate laminated strip remaining on said roller associated with said third extrusion device and being passed jointly through said second nip with said edge-trimmed strip disposed on said roller associated with said second extrusion device to produce a final laminated profile strip.

3. The method as recited in claim 1, wherein first, second, third and fourth extrusion devices are provided, each said extrusion device having a single roller associated therewith, edge-trimming both lateral edges of each of said strips while said strip is disposed on its associated roller; wherein said rollers associated with said first and said second extrusion device lie closely adjacent one another to define a first roller nip therebetween, said rollers associated with said third and fourth extrusion devices lie closely adjacent one another to define a second roller nip therebetween, and said rollers associated with second and third extrusion devices lie closely adjacent one another to define a third roller nip therebetween, and wherein said edge-trimmed strips disposed on said rollers associated with said first and second extrusion devices are passed jointly through said first nip to produce a first intermediate laminated profile strip which temporarily remains on said roller associated with said second extrusion device, and said edge-trimmed strips disposed on said rollers associated with said third and fourth extrusion devices are passed jointly through said second nip to produce a second intermediate laminated profile strip which temporarily remains on said roller associated with said third extrusion device, and passing said first and second intermediate laminated profile strips jointly through said third nip to produce a final laminated profile strip.

4. An apparatus for producing profile strips for tread strips, lateral strips, and inner liners of automotive vehicle tires from a plurality of different rubber components, comprising:
   (a) at least two separate extrusion devices, one for each component;
   (b) each of said at least two extrusion devices including head means for forming each extruded component into a strip, said head means including strip outlet nozzle means comprising a first stationary lip and a second movable lip comprising a rotatably roller including an outer peripheral surface, each strip extruded from said associated nozzle means passing through said outer peripheral surface;
   (c) edge-trimming means disposed adjacent each said roller for trimming both lateral edges of each said strip while said strip is located on said roller means;
   (d) said rollers from said at least two separate extrusion devices forming at least one roller assembly in which said roller associated with each said extrusion device lies closely adjacent the roller associated with another of said at least two extrusion devices to define a roller nip therebetween, whereby the strips disposed on each said roller defining said roller nip pass jointly through said nip and are laminated together thereby, two of said at least two extrusion devices being disposed in the same horizontal plane together with said roller nip, and
   (e) means for horizontally displacing one of said at least two extrusion devices and said roller associated therewith with respect to the other of said horizontally aligned extrusion devices and said roller associated therewith for adjusting the size of said nip.

5. The apparatus as recited in claim 4, comprising first, second and third extrusion devices, each said extrusion device having an individual single roller and edge-trimming means associated therewith, said single rollers being disposed in an L-shaped arrangement wherein the rollers associated with said first and second extrusion devices each lie closely adjacent said roller associated with said third extrusion device to define, respectively, first and second nips therebetween, whereby said individual edge-trimmed strips carried by said rollers associated with said first and third extrusion devices are passed jointly through said first nip to form an intermediate laminated profile strip which is temporarily carried on said roller associated with said third extrusion device, said intermediate laminated strip and said individual edge-trimmed strip disposed on said roller associated with said third extrusion thereafter being passed jointly through said second nip between said second and third rollers to form a final laminated profile strip.

6. The apparatus as recited in claim 4, comprising first, second, third and fourth extrusion devices, each said extrusion device having an individual single roller and edge-trimmiing means associated therewith, said single rollers being disposed in an L-shaped arrangement wherein said rollers associated with said first and second extrusion devices lie closely adjacent one another and define a first roll nip therebetween, said rollers associated with said third and fourth extrusion devices lie closely adjacent one another to define a second roll nip therebetween, and said rollers associated with said second and third extrusion devices lying closely adjacent one another to define a third roll nip therebetween, whereby said edge-trimmed strips disposed one on each of said rollers associated with said first and second extrusion devices produce in the first roll nip a first intermediate laminated profile strip which remains on said roller associated with said second extrusion device; and edge-trimmed strips disposed one on each said third and fourth extrusion devices produce in said second roll nip a second intermediate laminated strip which remains on said roller associated with said third extrusion device, said first and second intermediate laminated profile strips thereafter produce a final laminated profile strip in said third roll nip.

7. The apparatus as recited in claim 4, further including means for adjusting each said edge trimming means radially and axially relative to said individual roller with which said edge trimming means is associated.

8. The apparatus as recited in claim 4, further including means for separately controlling the temperature of each said roller and each said extrusion head.

9. An apparatus for producing profile strips for tread strips, lateral strips, and inner liners, of automotive vehicle tires from a plurality of different rubber components, comprising:
   (a) at least two separate extrusion devices, one for each component;
   (b) each of said at least two extrusion devices including head means for forming each extruded component into a strip, said head means including strip outlet nozzle means comprising a first stationary lip and a second movable lip comprising a rotatable roller including an outer peripheral surface, each strip extruded from said associated nozzle means passing around said outer peripheral surface;
   (c) edge-trimming means disposed adjacent each said roller for trimming both lateral edges of each said strip while said strip is located on said roller means;
   (d) said rollers from said at least two separate extrusion devices jointly forming at least one roller assembly in which said roller associated with each said extrusion device lies closely adjacent the roller associated with another of said at least two extrusion devices to define a roller nip therebetween, whereby the strips disposed on each said roller defining said roller nip pass jointly through said nip and are laminated together thereby, two of said at least two extrusion devices being aligned in the same plane together with said roller nip; and (e) means for displacing one of said at least two extrusion devices and said roller associated therewith with respect to the other of said aligned extrusion devices and said roller associated therewith for adjusting the size of said nip.

* * * * *